United States Patent [19]

Schwaerzler

[11] 4,408,737
[45] Oct. 11, 1983

[54] METHOD AND APPARATUS ENABLING A HORIZONTAL LANDING OF A FLYING BODY

[75] Inventor: Hans Schwaerzler, Munich, Fed. Rep. of Germany

[73] Assignee: Messerschmitt-Boelkow-Blohm Gesellschaft mit beschränkter Haftung, Munich, Fed. Rep. of Germany

[21] Appl. No.: 280,280

[22] Filed: Jul. 6, 1981

Related U.S. Application Data

[63] Continuation of Ser. No. 97,201, Nov. 26, 1979, abandoned.

[30] Foreign Application Priority Data

Dec. 2, 1978 [DE] Fed. Rep. of Germany ....... 2852220

[51] Int. Cl.³ .............................................. B64D 17/80
[52] U.S. Cl. .......................... 244/110 D; 244/DIG. 1; 244/139
[58] Field of Search ............... 244/139, 2, 49, DIG. 1, 244/110 D, 13, 142, 153 R, 113

[56] References Cited

U.S. PATENT DOCUMENTS

| | | |
|---|---|---|
| 3,089,667 | 5/1963 | Gosslau et al. ................. 244/110 D |
| 3,135,482 | 6/1964 | Girard ................................. 244/49 |
| 3,275,271 | 9/1966 | Forehand . | |
| 3,756,546 | 9/1973 | Carson, Jr. et al. ................. 244/140 |
| 3,796,398 | 5/1974 | Eilertson ............................. 244/139 |
| 3,980,259 | 9/1976 | Greenhalgh et al. ................ 244/139 |

FOREIGN PATENT DOCUMENTS

| | | |
|---|---|---|
| 2503322 | 7/1976 | Fed. Rep. of Germany ... 244/DIG. 1 |
| 1298406 | 6/1962 | France ........................ 244/DIG. 1 |
| 1237189 | 6/1971 | United Kingdom ................ 244/139 |

OTHER PUBLICATIONS

Johnson, "Low–Subsonic Flight Chara. of a Model of a Supersonic–Airplane Config. w/ a Parawing as a Landing Aid" NASA TN D–2031 1963.

Bugg et al., "Low–Speed Tests of an All Flexible Parawing for Landing a Lifting Body Spacecraft, NASA TN D–4010, 1967.

Nicolaides, "Parafoil Powered Flight Performance", Tech Rep. AFFDL-72-73, 1973.

"Aerodynamic Characteristics of the Parafoil Glider and other Gliding Parachutes", RTD-TDR-63-4022, 1964.

*Primary Examiner*—Galen L. Barefoot
*Attorney, Agent, or Firm*—W. G. Fasse; D. F. Gould

[57] ABSTRACT

A flying body such as an aircraft or a re-entry vehicle is enabled to land substantially horizontally with the aid of one or several glider parachutes also referred to as paragliders, which are stored in an upper body zone and ejected during the landing. The lift capacity of the paraglider is so dimensioned that it replaces the lift loss of the wings due to the low landing speed, whereby the weight of the flying body is kept in equilibrium to the sum of the wing lift and of the paraglider lift. The paraglider resistance or drag is compensated by the engine thrust and an ascending or descending flight is accomplished by modulating the engine thrust.

2 Claims, 4 Drawing Figures

METHOD AND APPARATUS ENABLING A HORIZONTAL LANDING OF A FLYING BODY

This is a Continuation of application Ser. No. 097,201 filed Nov. 26, 1979, now abandoned.

BACKGROUND OF THE INVENTION

The present invention relates to a method and to an apparatus for enabling a horizontal landing of a flying body by using a so-called paraglider which is stored in a space of the flying body for ejection during the landing operation. Advantageously the paraglider is stored in the upper portion of the fuselage.

The use of parachutes of landing or rather for providing a braking action for the aircraft during the landing is well known in the art and several modifications are known. Primarily vertical landing methods are involved, whereby the parachute functions as a so-called "aircraft carrier" which, in a sense, deposits the craft or vehicle on the ground. These methods have a number of disadvantages which to some extent are rather substantial. On the one hand, these prior art landing methods require parachutes of very large diameter. To avoid such large diameter parachutes it is also known to use instead a plurality of smaller parachutes to satisfy the requirement. Another advantage of the vertical landing approach is the large landing shock upon impact. In most instances such landing shock cannot be taken up by the shock absorber system of the landing gear since the impact shock cannot be predetermined to any reliable extent, especially since the air and lift conditions prevailing at or above the landing spot are subject to continuous change. In order to avoid or at least minimize the danger of a crash landing in any event, it is necessary in connection with prior art methods to install over-dimensioned shock absorber systems which are correspondingly expensive. Such over-dimensioned shock absorber systems cause a substantial structural modification, especially in small aircraft.

Yet another disadvantage of prior art methods is seen in that the landing location cannot be exactly determined due to the uncertainties involved in the floating or hovering toward the ground. Thus, in most instances it is necessary in connection with prior art landing methods of this type to perform an expensive operation for recovering the flying body. Besides, the relatively expensive parachutes are exposed to a substantial danger of destruction due to the just mentioned uncertainties and lack of precision in the landing operation.

U.S. Pat. No. 3,315,920 discloses an emergency landing apparatus for commercial aircraft comprising a plurality of parachutes which are stored in chambers arranged in the topside of the fuselage for ejection. Additional parachutes are arranged in the vertical tail surfaces and in the horizontal elevator structure. These additional parachutes also serve for the purpose of providing a braking action. Even if one disregards the substantial expense for the large number of parachutes and for their storing and ejection facilities, the above mentioned disadvantages applicable to the vertical landing parachute, apply equally to the just mentioned emergency landing apparatus.

U.S. Pat. No. 3,721,408 discloses an ejectable arrangement of parachute and drag parachute means comprising a plurality of parachutes operatively connected to a retro-rocket. Both systems are connected by means of ropes to the flying body in such a manner that the main forces extend through the center of gravity of the flying body. The parachutes serve as landing brakes during the initial stage of the landing operation. Upon reaching of the intended limiting area, a sensor causes the explosive separation of one of the parachute holding ropes so that the drag parachutes and the retro-rocket may take up automatically a vertical position with the flying body to thereby enable a pure vertical landing.

However, even this system as disclosed in U.S. Pat. No. 3,721,408 is not quite capable of satisfactorily solving the above mentioned problems because in spite of the expensive sensor arrangement a precisely pin-pointed landing is not possible anymore at the instant when the vertical parachute position is taken up. This is so because wind conditions and other factors still play an uncontrollable role. In any event, this prior art does not disclose anything regarding additional control means and so forth.

U.S. Pat. No. 3,980,259 and U.S. Pat. No. 4,040,583 disclose the use of control parachutes in connection with a flying body. However, the prior art devices are not capable of performing a horizontal parachute landing because the parachute arrangements are used as flying equipment so to speak and not as an additional lift producing means during the landing approach.

OBJECTS OF THE INVENTION

In view of the above it is the aim of the invention to achieve the following objects singly or in combination:

to provide a horizontal landing device or system of the type described above which is free of the disadvantages of the prior art and which makes it possible to control a landing precisely into the intended target;

to employ so-called paragliders as additional, controlled lift producing means during the landing operation;

to combine the compensating lift of the paraglider with a pitch and rolling control as well as with a yawing control;

to substantially reduce the diameter of the paraglider as compared to the parachute diameters necessary heretofore; and to keep the shock of the landing impact substantially in the range of a normal horizontal aircraft landing.

SUMMARY OF THE INVENTION

According to the invention the flying body is equipped with one or several paragliders developing a lift capacity which during the landing operation replaces the lift loss resulting due to the low landing speed. Such lift loss may be substantial since high performance aircraft or flying bodies normally have small wings. The substitution of the lost lift by the lift of the paraglider is such that the sum of the lift produced by the paraglider and the remaining lift of the wings corresponds to the weight of the flying body. The drag resistance of the paraglider or parachute is conmpensated by the engine thrust. The engine thrust is modulated in order to achieve any desired ascending or descending flight.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
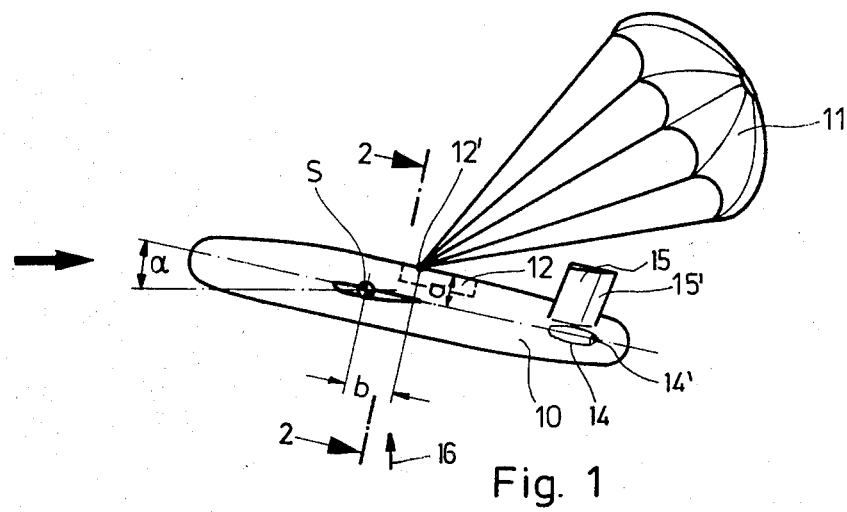
FIG. 1 is a simplified side view of the landing system according to the invention in which the pivoting of the paraglider to the flying body is shown schematically.

FIG. 1 shows the pivoting of paraglider means 11, which may comprise one or several paragliders, to the flying body 10 by conventional pivoting connecting means 12' in such a position that during normal flight the paraglider may be stored in a chamber 12 in the top side of the flying body fuselage. In the example of FIG. 1, paraglider means 11 is in the form of a parachute canopy. During the landing operation the resistance or drag of the paraglider 11 is compensated by increasing the thrust of the engine or engines shown schematically in FIG. 2. The thrust of these engines is effective approximately in the direction of the longitudinal fuselage axis. Since the flying apparatus generally flys with a high angle of attack ($\alpha$) relative to the horizontal flight path a thrust component 16 results which is directed vertically upwardly and which additionally supports the lift of the paraglider and the lift of the wing or wings. Thus, a lifting force is produced which during the landing flight may reach the substantial value of 20% of the landing weight due to the use of the parachute with its high drag in combination with the engine thrust.

In order to control the flying body or rather the combination of the flying body and the parachute, the wings 13 are provided with control flaps or rudders 13' while the elevator means 14 are provided with respective control flaps or rudders 14'. These control flaps 13', 14' are used for a pitching control or steering and for a rolling control or steering.

Figure 3:
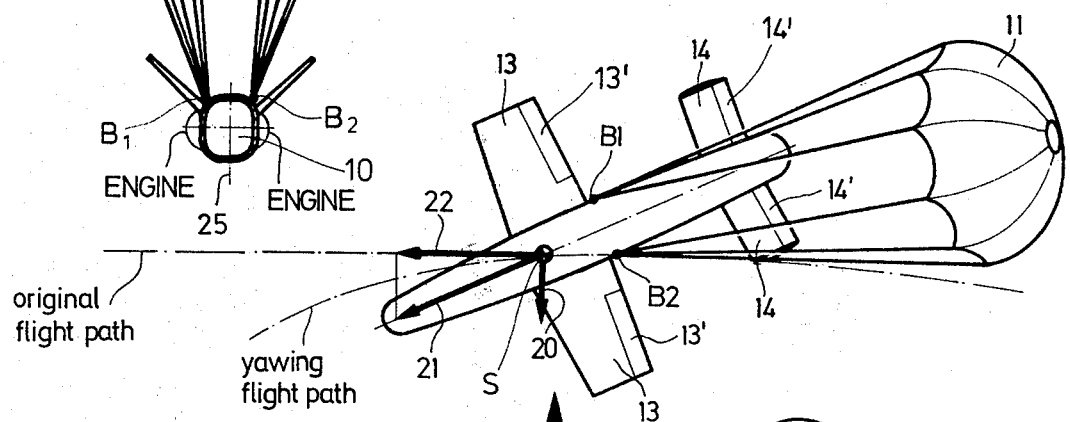
FIG. 3 is a top plan view of a flying body negotiating a curve during the landing operation.

As shown in FIG. 3 the flying through a curve or the compensation of side winds is accomplished by a steering control resulting in a yawing flight. This is accomplished by the yawing rudder 15' forming part of the vertical tail 15 shown in FIG. 1. This yawing flight control results in a horizontal thrust component 20 of the engine thrust 21. The horizontal thrust component 20 extends perpendicularly to the yawing flight path while the thrust component 22 effective in the direction of the original flight path is compensated by the paraglider drag as shown in FIG. 3.

Figure 2:
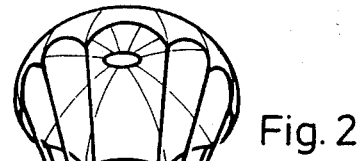
FIG. 2 is a sectional view along section line 2—2 in FIG. 1.

Referring again to FIG. 1 the pivoting 12' of the paraglider harness to the flying body 10 is spaced according to the invention from the center of gravity "S". Thus, the pivoting point is located by a spacing "a" above the center of gravity "S" and by a spacing "b" behind the center of gravity "S". It has been found that it is most advantageous to make "a" to be equal "b". Where a twin harness is used as shown in FIG. 2 the two pivoting points B1 and B2 are located to the right and left of the vertical center plane of the flying body 10 as shown in FIG. 2. The just described locating of the pivoting points makes sure that the angle of attack ($\alpha$) for the flying body 10 is maintained at its optimally effective value.

Figure 4:
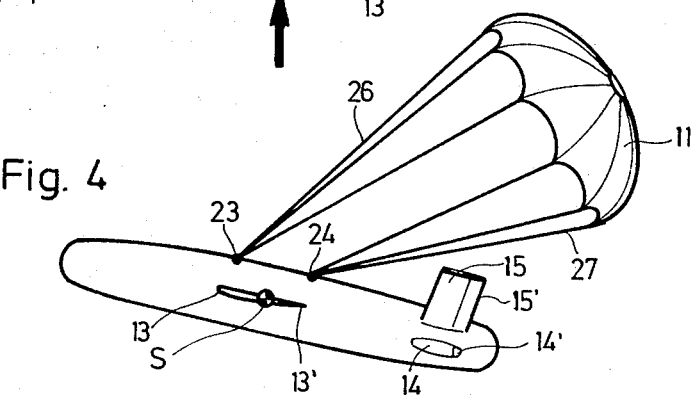
FIG. 4 is a view similar to that of FIG. 1 but showing a modified pivoting or suspension of the flying body to the paraglider.

FIG. 4 shows a modification in which the pivoting points 23 and 24 between the cords of the parachute canopy paraglider 11 are located in the central plane 25 of the aircraft rather than laterally thereof, please see FIG. 2. Thus, according to the invention the forward load suspending cords 26 must be longer than the rear load suspending cords 27. However, as shown in FIG. 4, the length of the load suspending cords 26 on the one hand and of the cords 27 on the other hand is respectively constant. This different but constant cord length is also required in the instance where the front and rear set of cords is divided into respective two sets connected to the craft as shown in FIG. 2. In the mentioned example two pivoting points would be arranged on each side of the flying body whereby one pivoting point on each side would be located forward of the center of gravity while the other point on the same side would be located rearwardly of the center of gravity.

The suggested combination of features now makes it possible to achieve a horizontal landing of a flying body by means of a paraglider. This applies especially to remote controlled aircraft, to satellites and other space bodies. As compared to the vertical landing customary heretofore, the paragliders according to the invention require a diameter which is about 70% smaller than the diameter of parachutes used heretofore for vertical landing operations. Paragliders having a diameter corresponding to about 30% of the diameter of the vertical landing parachutes, have the advantage of a substantially reduced parachute weight and a respectively reduced volume of storage in the chamber 12. Additionally, such paragliders require substantially less material to make them.

It has been found that the landing impact is within the range of a normal horizontal aircraft landing, whereby the installation of over-dimensioned shock absorbers is avoided according to the invention. However, the most important advantage of the invention is seen in that a precise target landing is now possible by employing the teachings of the invention.

To achieve a balance for the combination "flying body and parachute" in the horizontal flight, it must be possible to produce a power equivalent to the resistance of the paraglider, but this power is active in the direction of the thrust of the engines. Thus, the resistance of the paraglider is compensated by the thrust of the engines.

At the climbing flight and the landing flight this balance will be varied with modulation of the thrust of the engines. At the climbing flight this thrust of the engines is larger than the resistance of the paraglider and at the landing flight, this thrust of the engines is smaller.

Although the invention has been described with reference to specific example embodiments, it will be appreciated, that it is intended to cover all modifications and equivalents within the scope of the appended claims.

What is claimed is:

1. An apparatus for horizontally landing a flying body having a center of gravity and steering means, comprising paraglider canopy parachute means having a given diameter and being normally stored in a top side portion of the flying body, said parachute means including load suspending means comprising a plurality of load suspending flexible cords divided into at least two groups of load suspending cords, said apparatus further comprising at least two pivot point means (23, 24) including a forward pivot point secured to said flying body forward of said center of gravity and rearward pivot point means secured to said flying body to the rear of said center of gravity, one group of load suspending cords (26) being connected to said forward pivot point (23) and the other group of load suspending cords being connected to said rearward pivot point means, each group of cords having a given constant length such that said one group of load suspending cords connected to the forward pivot point is longer than the other group of load suspending cords connected to the rearward pivot point means, whereby the load exerted by the flying body on the load suspending cords is suspended at least at two axially separated pivot points and so that said given diameter of said paraglider canopy parachute is at least about 70% smaller than the diameter of a conventional parachute for a substantially vertical landing of a comparable load.

2. The apparatus of claim 1, wherein said rearward pivot point means comprise two pivot points, one located to the right and the other located to the left of a longitudinal central axis of the flying body, said two rearward pivot points being located in a common plane extending perpendicularly to said longitudinal central axis.

* * * * *